(12) United States Patent
Wötzer

(10) Patent No.: US 10,571,341 B2
(45) Date of Patent: Feb. 25, 2020

(54) DISPLAY DEVICE

(71) Applicant: INNORESE AG, St. Gallen (CH)

(72) Inventor: Philipp Wötzer, Obsteig (AT)

(73) Assignee: INNORESE AG, St. Gallen (CH)

( * ) Notice: Subject to any disclaimer, the term of this patent is extended or adjusted under 35 U.S.C. 154(b) by 0 days.

(21) Appl. No.: 14/432,975

(22) PCT Filed: Sep. 30, 2013

(86) PCT No.: PCT/EP2013/070328
§ 371 (c)(1),
(2) Date: Apr. 1, 2015

(87) PCT Pub. No.: WO2014/053435
PCT Pub. Date: Apr. 10, 2014

(65) Prior Publication Data
US 2015/0260584 A1 Sep. 17, 2015

(30) Foreign Application Priority Data

Oct. 1, 2012 (EP) .................................. 12186803

(51) Int. Cl.
*G01K 1/02* (2006.01)
*G01K 3/04* (2006.01)
(Continued)

(52) U.S. Cl.
CPC .............. *G01K 1/02* (2013.01); *G01K 3/04* (2013.01); *G01K 11/06* (2013.01); *G01K 11/12* (2013.01)

(58) Field of Classification Search
CPC .......... G01K 1/02; G01K 11/12; G01K 11/06; G01K 3/04
(Continued)

(56) References Cited

U.S. PATENT DOCUMENTS 2,971,852 A * 2/1961 Schulein ................ G01K 11/06
116/217
3,395,903 A 8/1968 Norgack et al.
(Continued)

FOREIGN PATENT DOCUMENTS

CA 2096742 A1 5/1992
DE 2328382 A1 1/1975
(Continued)

OTHER PUBLICATIONS

International Search Report, International Application No. PCT/EP2013/070328; International Filing Date: Sep. 30, 2013, 5 pages (including translation; dated Dec. 2, 2013.
(Continued)

*Primary Examiner* — Xiaoyun R Xu
(74) *Attorney, Agent, or Firm* — Stites & Harbison, PLLC; Terry L. Wright

(57) ABSTRACT

The present invention relates to devices for displaying the previous history of products, e.g. in relation to the development of temperature. The device according to the invention comprises a surface layer, an indicator layer, an activator layer and an optional delaying layer. Heating releases moisture which migrates in some embodiments first into the delaying layer and then into the activator layer. Here, an activator is mobilized and migrates together with the humidity into the indicator layer. A colour change occurs as a result of the interaction of the indicator with the activator in the presence of moisture, which change indicates that the critical temperature has been exceeded. The present invention further relates to a method for producing the device according to the invention and to applications of said device, e.g. in monitoring the temperature of sensitive products.

20 Claims, 7 Drawing Sheets

(51) Int. Cl.
*G01K 11/06* (2006.01)
*G01K 11/12* (2006.01)

(58) Field of Classification Search
USPC .................. 116/206–207, 216–220; 374/106
See application file for complete search history.

(56) References Cited

U.S. PATENT DOCUMENTS

| | | | |
|---|---|---|---|
| 3,695,903 | A | 10/1972 | Telkes et al. |
| 3,844,718 | A | 10/1974 | Cohen |
| 3,967,579 | A * | 7/1976 | Seiter .................... G01K 11/08 116/207 |
| 4,057,029 | A * | 11/1977 | Seiter .................... G01K 11/06 116/207 |
| 4,149,852 | A | 4/1979 | Tiru |
| 4,150,570 | A | 4/1979 | Fuller |
| 4,154,107 | A * | 5/1979 | Giezen ................... G01K 11/16 116/207 |
| 4,163,427 | A * | 8/1979 | Cooperman .......... G01K 11/06 116/207 |
| 5,053,339 | A * | 10/1991 | Patel .................... G01N 31/229 116/206 |
| 5,667,303 | A * | 9/1997 | Arens ..................... G01K 3/04 116/219 |
| 5,990,199 | A | 11/1999 | Bealing et al. |
| 6,042,264 | A | 3/2000 | Prusik et al. |
| 6,378,454 | B1 * | 4/2002 | Massi ..................... G01K 3/04 116/206 |
| 7,036,452 | B1 | 5/2006 | Tester |
| 7,430,982 | B2 * | 10/2008 | Koivukunnas .......... G01K 3/04 116/207 |
| 2003/0024465 | A1 | 2/2003 | Perner et al. |
| 2009/0050047 | A1 | 2/2009 | Wotzer |
| 2009/0123334 | A1 | 5/2009 | Cavallini et al. |
| 2009/0301382 | A1 | 12/2009 | Patel |
| 2011/0168079 | A1 | 7/2011 | Suda et al. |
| 2012/0326878 | A1 | 12/2012 | Viguie et al. |
| 2014/0352602 | A1 * | 12/2014 | Manion .................. A61L 29/14 116/201 |
| 2017/0131152 | A1 | 5/2017 | Wotzer |

FOREIGN PATENT DOCUMENTS

| | | | | |
|---|---|---|---|---|
| DE | 2547638 | A1 | | 4/1977 |
| DE | 2718697 | A1 | | 11/1977 |
| DE | 19912529 | A1 | | 9/2000 |
| EP | 0821714 | B1 | | 2/1998 |
| EP | 1281946 | A1 | | 2/2003 |
| EP | 2216636 | A1 | | 8/2010 |
| EP | 2378354 | A1 | | 10/2011 |
| EP | 2745287 | A2 | | 6/2014 |
| EP | 2015056868 | * | 8/2015 | ............... G01K 3/04 |
| FR | 2739687 | A1 | | 4/1997 |
| KR | 20100034139 | A | | 4/2010 |
| SU | 512392 | A1 | | 4/1976 |
| WO | WO-92/09870 | A1 | | 6/1992 |
| WO | 2013/024298 | A2 | | 2/2013 |
| WO | WO-2015150312 | A1 | | 10/2015 |

OTHER PUBLICATIONS

Hoerl et al., Mathematics. Perry's Chemical Engineers' Handbook, Sixth Edition. McGraw-Hill, Inc., New York, Robert H. Perry (Ed.). Section 2, pp. 2-1-2-116 (1984).

Khan et al., Analytical Applications of Plant Extract as Natural pH Indicator: A Review. Journal of Advanced Scientific Research. 2011;2(4):20-27.

Honduran Trademark and Patent Office, Office Action issued in corresponding Application No. 2015000694 dated Sep. 16, 2019. (Translation not available.).

* cited by examiner

DISPLAY DEVICE

RELATED APPLICATIONS

This application is a 35 U.S.C. § 371 national stage filing of International Application No. PCT/EP2013/070328, filed Sep. 30, 2013, which claims priority to European Patent Application No. 12186803.8, filed Oct. 1, 2012. The entire contents of each of the foregoing applications are incorporated herein by reference.

TECHNICAL FIELD

The present invention relates to display devices and in particular to devices for recording and displaying the previous thermal history of refrigerated goods and in particular of deep frozen products. Moreover, it relates to methods for producing such devices and to the application of the devices according to the invention when monitoring the previous thermal history of refrigerated products and in particular deep frozen products.

PRIOR ART

Devices for displaying the previous thermal history of products (also called "temperature/time indicators") display whether the refrigeration chain of the product in question has been broken, i.e. whether the product has exceeded a critical temperature over a relevant period of time. These types of display device are of particular interest for deep frozen products. In this case the device indicates whether the product has been able to heat up to a temperature above the critical temperature of 0° C.

There is a great need for such display devices because if the refrigeration chain is broken, the desired product quality can no longer be guaranteed. Thus, for example, with deep frozen foods there is a risk of uncontrolled bacteria growth if the deep freezing chain is broken. Such bacteria growth may conceal considerable health risks for the consumer.

In consideration of this need a wide variety of attempts have been and are being made to develop suitable temperature/time indicators. One can name here, for example, the display device according to WO 2007/045424 as well as the BASF OnVu ICE time/temperature indicators and indicators made by the company Timestrip in 40549 Düsseldorf.

However, the time/temperature indicators known from the prior art are not capable of reliably indicating interruptions in the refrigeration chain. On the one hand there is the risk that short-term heating of the packaging (e.g. by the hands of the consumer in the supermarket) will lead to a false positive display. On the other hand, there is the risk with the time/temperature indicators of the prior art that an interruption to the refrigeration chain is not indicated as such if there is air between the refrigerated product and the display device within the packaging.

Another problem which occurs, for example with the commercial indicator made by the company Timestrip, is the uniformity of the colour change displayed (i.e. the consistent period of time between reaching a critical temperature of the indicator and the colour change—independently of the nature of the refrigerated product). Such uniformity is undesirable because many deep frozen products defrost considerably faster than others. A reliable display should take such differences into consideration.

Summary of the invention

In consideration of the aforementioned problems associated with the time/temperature indicators known from the prior art, the present invention is concerned with the object of providing a time/temperature indicator which reliably displays breaks in the refrigeration chain without giving false positive displays and with which breaks in the refrigeration chain are reliably displayed, even if there is air between the refrigerated product and the display device. Furthermore, the display of the indicator according to the invention should take into account the actual defrosting speed of the refrigerated product.

This object is achieved by the device which comprises the following layers:

(a) a surface layer (1) impermeable to moisture,
(b) an indicator layer (2) that comprises at least one indicator,
(c) an activator layer (3) that comprises at least one activator, and
(d) an optional delaying layer (4), the surface layer being positioned over the indicator layer, the activator layer and the delaying layer, the indicator layer being positioned between the surface layer and the optional delaying layer, and the activator layer being able to be absent if an indicator that is activated by $H_2O$ is used.

Preferred configurations of this device are characterized below:

the device, wherein the indicator layer comprises a pH indicator, preferably an anthocyanin colorant, and the activator layer has an acid or an alkali as the activator;

the device, wherein the indicator layer and/or the activator layer comprise a matrix material which is chosen from at least one of agar-agar, carrageenan, gelatine, starch, gum arabic, cellulose, arrowroot starch, guar gum and polyethylene glycol;

the device, wherein the indicator layer and/or the activator layer contain at least one hygroscopic salt which is preferably chosen from the group consisting of magnesium chloride, potassium chloride and calcium chloride;

the device, wherein the delaying layer (d) is present and formed from paper or cardboard with a thickness of 40-60 $g/cm^2$ according to DIN 6730;

the device, wherein the activator layer (d) is formed from 2-30, preferably 3-8, more preferably 4-6 sequential individual layers;

the device, wherein the indicator layer (c) is formed from 2-40, preferably 4-10, more preferably 6-8 sequential individual layers;

the device, wherein the layers (a), (b), (c) and (d) are arranged as follows:

(a) surface layer (1),
(b) indicator layer (2),
(c) optional delaying layer (4), and
(d) activator layer (3), or (a) surface layer (1),
(b) activator layer (3),
(c) indicator layer (2), and
(d) optional delaying layer (4), or (a) surface layer (1),
(b) indicator layer (2),
(c) activator layer (3), and
(d) optional delaying layer (4);

the device as described above which is applied to packaging of a product;

the device as described above which is applied to packaging of a product, wherein the product is refrigerated and wherein a period of time between first defrosting of the product and color change of the indicator is in the range of 0.5 hours to 3 hours.

The present invention further relates to methods for producing the display devices according to the invention. These methods are characterized below.

A method, wherein one or more of the layers present in the device are formed by carrying out procedural steps (i) and (ii) sequentially one or more times:
(i) printing and
(ii) drying the printed layer.

A method selected from the following methods:
a method which comprises the following steps:
(A-1) providing the surface layer (1),
(A-2) coating the surface layer (1) with the indicator layer (2),
(A-3) drying the indicator layer (2) to produce an arrangement (A);
(B-1) providing a delaying layer (4),
(B-2) coating the delaying layer (4) with the activator layer (3),
(B-3) drying of the activator layer (3) to produce an arrangement (B);
(C) laminating the arrangements (A) and (B) and
a method which comprises the following steps:
(A'-1) providing the surface layer (1),
(A'-2) coating the surface layer (a) with the activator layer (3),
(A'-3) drying the activator layer (3) to produce an arrangement (A')
(B'-1) providing a delaying layer (d)
(B'-2) coating the delaying layer (d) with the indicator layer (2),
(B'-3) drying the indicator layer (2) to produce an arrangement (B')
(C') laminating the arrangements (A') and (B').

A method, wherein a first layer, chosen from the surface layer and the delaying layer, is provided; and wherein the other layers of the device are applied sequentially according to the sequence of their arrangement in the device; and wherein at least upon applying the indicator layer and the activator layer the layer which is applied first is dried prior to applying a subsequent layer, and the component or components of the subsequent layer are provided and applied in a highly volatile organic solvent if no additional layer is provided between the indicator layer and the activator layer.

Finally, the present invention also relates to packaging for deep frozen product comprising the device as described above, and to the deep frozen products comprising this packaging.

Figure 1:
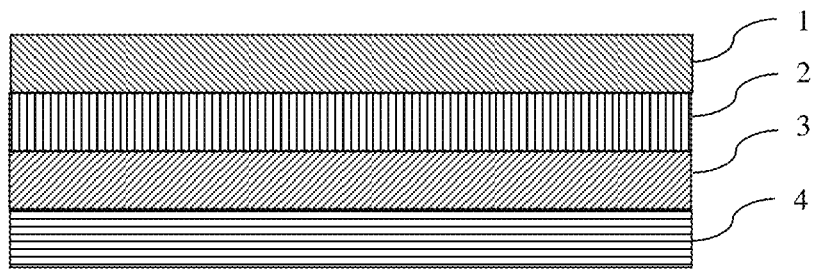
FIG. 1 illustrates the layer sequence of the device according to the invention in its simplest configuration.

The reference numbers used in the figures signify as follows:
1—surface layer (a)
2—indicator layer (b)
3—activator layer (c)
4—delaying layer (d)
4'—delaying layer (d) as a component part of the product packaging
5—upper adhesive layer
6—middle adhesive layer
7—lower adhesive layer
8—separating layer

DETAILED DESCRIPTION OF THE INVENTION

Definitions

In connection with the present invention the term "indicator" relates to a substance which, upon interacting (chemical or physical reaction) with the activator, changes its visual appearance. This includes in particular a colour change, the colours (including colourless) not being determined before and after the colour change.

In connection with the present invention the term "activator" relates to a substance which, as a result of the interaction with the indicator, is suitable for bringing about a change to the visual appearance of the indicator.

The suitability of a substance as an indicator or an activator in the sense of the present invention depends upon the identity of the respective reactant. Therefore, fulfillment of the "indicator" criterion is always to be tested in connection with fulfillment of the "activator" criterion (and vice versa). The suitability of the indicator also includes the presence of the indicator in a form suitable for reaction with the activator, e.g. the presence of a pH indicator in protonated form if the activator is an alkali or the presence of a pH indicator in the deprotonated form if the activator is an acid.

In connection with the present invention the specification of the "period of time between the start of defrosting and the colour change" (also called "change time" in this application) relates to the period of time which can be measured until a colour change can be seen with the naked eye if a deep frozen pea product (300 g, deep frozen temperature −18° C., standard packaging, no film on the inside, only 320 g/m$^2$ cardboard outer packaging) is brought into a room temperature environment (wooden table below, air to the side and above, respectively brought to a temperature of +20° C.).

The change time is essentially determined by the "overall delaying effect" of the "relevant layers". The "overall delaying effect" means the period of time that is required for an amount of moisture sufficient for the colour change to migrate from the refrigerated product, through all relevant layers, to the uppermost colouring layer. In this connection the term "relevant layers" refers to all of the layers of the device according to the invention from the lowermost layer to and including the uppermost colouring layer. The product packaging lying beneath the device according to the invention is also a relevant layer determining the overall delaying effect. If the type of product packaging is not known, in order to determine the overall delaying effect one is to assume the use of cardboard packaging with a thickness of 320 g/m$^2$.

It is an essential feature of the device according to the invention that it is dry prior to the penetration of moisture from the refrigerated product. In this connection "dry" means a moisture content that is so small that the colour reaction, which leads to the desired colour change, does not take place to an extent that can be seen with the naked eye. This applies in particular to the anticipated storage conditions, i.e. for example to storage of the device according to the invention at 25° C. and <5% relative air humidity over a period of 2 months, preferably 6 months. Preferably, a colour reaction that can be seen with the naked eye does not take place either when the device according to the invention is stored at −18° C. and 100% relative air humidity for 12 months, preferably 24 months.

Unless specified to the contrary in the present application, the terms used here have the generally customary meaning in the technical field in question as can be taken e.g. from appropriate lexica, specialist dictionaries and encyclopaedias.

Grammages of paper and cardboard relate to grammages according to DIN 6730. For films, specified grammages relate to DIN 53352. Specified film thicknesses relate to DIN 53370.

Overview

Surprisingly, it has now been found that the moisture that is formed by heating deep frozen products to temperatures of above 0° C. within the packaging migrates in sufficient quantities through the packaging of the deep frozen products so as to be able to trigger chemical reactions on its outside. The present invention utilises this knowledge in order to indicate heating to above the freezing point: Upon heating to above the freezing point, moisture is released by the partial defrosting of the refrigerated product. Part of this moisture migrates through the packaging to the display device according to the invention. The moisture penetrates into the device according to the invention. The indicator and/or the activator are solubilised or mobilised by the moisture here. As a result, the previously spatially separated indicator and activator components are brought together. When these two components meet, a chemical or physical reaction takes place which leads to a colour change. This colour change serves to indicate the heating of the product to a temperature above the temperature at which the refrigerated product starts to defrost.

The sensitivity of the device according to the invention can be increased by using materials with particularly pronounced hygroscopy (e.g. as a matrix material of the indicator and/or activator layer described in more detail below). However, limits are set for this measure by the required storage stability. Particularly hygroscopic materials will already "draw" a large amount of moisture when stored for a short time under average moisture conditions, and so trigger an undesired premature colour reaction.

The mode of operation of the device according to the invention is based on the moisture released from the refrigerated product upon defrosting. Consequently, with the device according to the invention it is neither necessary for nor is provision made such that there are moisture reservoirs in one or a number of the layers of the device according to the invention.

The required duration of exceedance of the minimum defrosting temperature of the refrigerated product until there is a colour change can be set by an appropriate choice of layer materials used or of their thicknesses.

The device according to the invention is characterised in that no adaptation of the underlying product packaging is required (if the latter is made of cardboard or of some other moisture-permeable material). In particular, no opening in the product packaging and no "wick" through the product packaging either is required.

Another essential aspect of the present invention is the possibility of producing the device according to the invention layer by layer using an established printing process such as e.g. an offset or flexographic printing process.

Layer Sequence

As explained above, the present invention is based on the spatial separation of the indicator and the activator by providing these components in separate layers.

Other essential elements of the device according to the invention are a surface layer (1), which protects the device from moisture towards the outside atmosphere, and a delaying layer (4) which regulates the conveyance of moisture from the refrigerated product to the activator layer and to the indicator layer. The delaying layer can also be made from the product packaging on which the device is placed. In this case one can dispense with a separate delaying layer. All additional layers are not necessarily required for the correct function of the device, and so are optional. In its simplest embodiment the device according to the invention is therefore characterised by the following layers. The layer sequence specified below (starting from the side lying away from the refrigerated product) constitutes a preferred embodiment of the device according to the invention:

(a) surface layer (1);
(b) indicator layer (2);
(c) activator layer (3);
(d) optional delaying layer (4).

However, this layer sequence is not essential for successful implementation of the invention. Only the following boundary conditions with regard to the layer sequence are to be fulfilled:

(i) The surface layer must be the furthest away from the refrigerated product in relation to the indicator layer, the activator layer and the delaying layer;
(ii) At least the indicator layer must be further away from the refrigerated product than the optionally provided delaying layer.

Therefore, in the case of the delaying layer being provided, the position of the activator layer can lie between the surface layer and the indicator layer, between the indicator layer and the delaying layer, or beneath the delaying layer. The following additional layer sequences are thus produced in addition to the above layer sequence (1)-(2)-(3)-(4): (1)-(3)-(2)-(4) and (1)-(2)-(4)-(3).

Additional optional layers can be introduced provided this does not have any negative impact upon the function according to the invention. In particular, the following additional layers can be provided:

Adhesive layers (5, 6, 7) can be added in order to guarantee the cohesion of the layer sequence. In particular, with the layer sequence shown above it is possible to provide an upper adhesive layer (5) directly beneath the surface layer 1);
to provide a middle adhesive layer (6) between the indicator layer (2) and the activator layer (3); and/or
to provide a lower adhesive layer (7) beneath the delaying layer (4).

As an additional optional layer a separating layer (8) can be provided between the indicator layer (2) and the activator layer (3) so as to thus prevent direct contact of the activator and the indicator on the boundary surface between the layers and to provide another possibility for regulating the activation time until there is a colour change. Moreover, said separating layer (8) can simplify production of the device according to the invention.

Other layers are also conceivable such as e.g. separating layers between other layers of the device according to the invention and/or additional indicator and/or activator layers which can, for example, bring about additional colour changes under certain conditions. Likewise, it is not ruled out to provide a number of the layers described here in multiples. For example, one could consider providing the layer sequences described in this application twice or a number of times one over the other. This type of "sandwich structure" using two or more indicator and/or activator layers leads to a gradual or step-by-step colour change which makes it possible to distinguish between short-term and longer-term interruptions to the refrigeration chain.

Other significant embodiments of the present invention are characterised by the following layer sequences:
(a) surface layer (1)
(oH) upper adhesive layer (5)
(b) indicator layer (2)
(mH) middle adhesive layer (6)
(c) activator layer (3)
(d) delaying layer (4)
(uH) lower adhesive layer (5)
and
(a) surface layer (1)
(oH) upper adhesive layer (5)
(b) indicator layer (2)
(t) separating layer (8)
(e) activator layer (3)
(d) delaying layer (4)
(uH) lower adhesive layer (7);

With these two layer sequences it is of course possible to leave out the lower adhesive layer (7) in each case, to leave out the upper adhesive layer (5) in each case or to leave out both the lower and the upper adhesive layer (5, 7).

FIG. 1 shows the layer sequence according to one of the simplest embodiments of the present invention. Since no adhesive layers are provided in this embodiment, this embodiment is an option in particular in cases in which the device according to the invention is to be integrated into the product packaging, i.e. in which the surface layer forms a layer of the product packaging. Alternatively, the layer sequence according to FIG. 1 could be held together by a stuck-on product label. In this connection the product label must be transparent in the region of the device according to the invention. The delaying layer may be formed by a layer of the product packaging lying further to the inside or may be positioned over one such layer. By integrating the device according to the invention into the product packaging in this way the desired cohesion of the layers can also be guaranteed without any adhesive layers lying in between.

Figure 2:
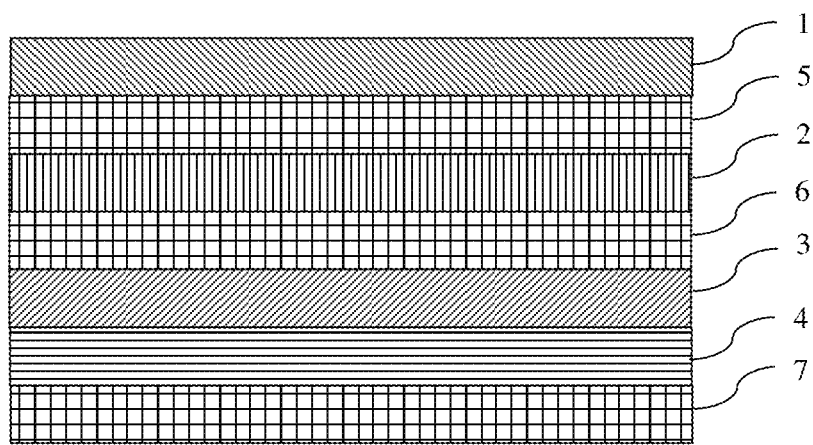
FIG. 2 illustrates the layer sequence of the device according to the invention in another configuration with adhesive layers.

With the layer sequence according to the second embodiment the cohesion of the layers and the integrity of the device is achieved by appropriate adhesive layers. This is shown in FIG. 2.

Figure 3:
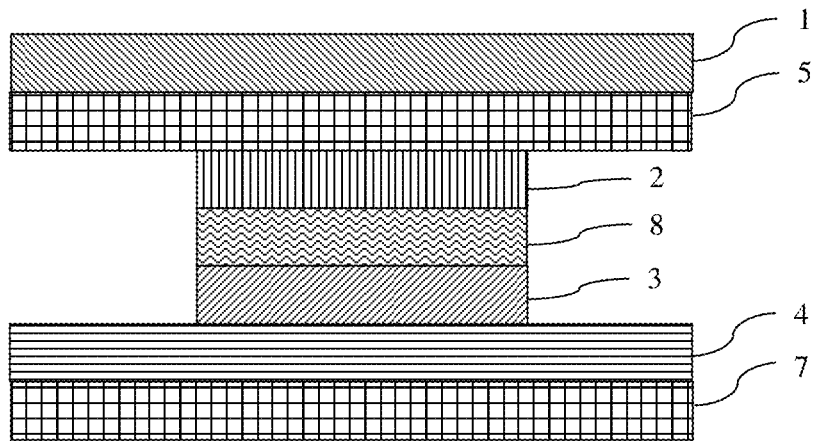
FIGS. 3 to 13 illustrate the layer sequences of other devices according to the invention.

In the embodiment according to FIG. 3 the middle adhesive layer is replaced by a separating layer (8). The cohesion of the layers is guaranteed by a broader configuration of the surface layer (1) and of the upper adhesive layer (5) which enables direct contact and cohesion with the delaying layer (4) outside of the region covered by the indicator layer (2) and the activator layer (3). In the layer sequence shown in FIG. 3 the separating layer (8) is optional, i.e. an additional embodiment relates to the same layer sequence, but without the separating layer.

Figure 4A:
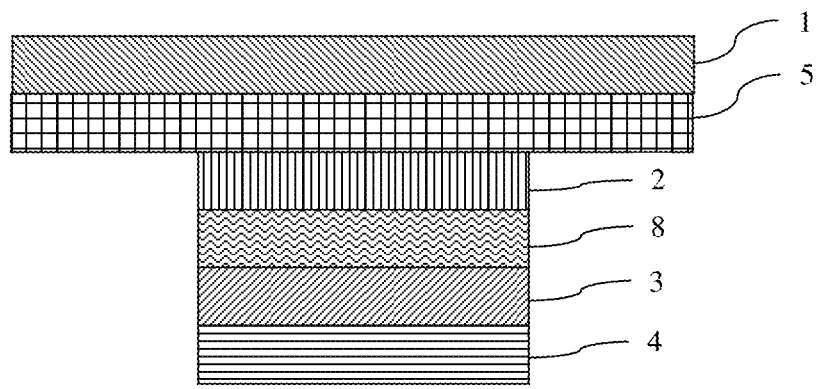

FIG. 4a shows the layer sequence of another embodiment of the present invention. In this case there is only a single adhesive layer, namely the upper adhesive layer (5) between the surface layer (1) and the indicator layer (2). The cohesion of the layers and so the integrity of the device are guaranteed by larger dimensions of the surface layer and of the upper adhesive layer (5). The upper adhesive layer reaching over the indicator layer (2), the activator layer (3) and the delaying layer (4) comes into direct contact with the product packaging and forms a stabile adhesive bond with the latter. This embodiment is once again shown with the optional separating layer (8).

Figure 4B:
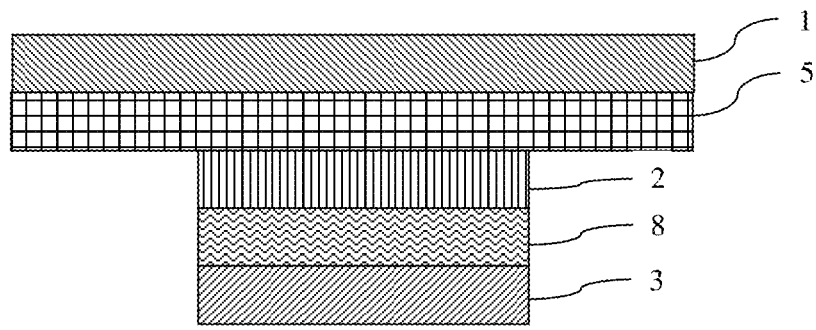

FIG. 4b shows another version of the embodiment according to FIG. 4a. In this version the delaying layer (4) has been left out.

Figure 4C:
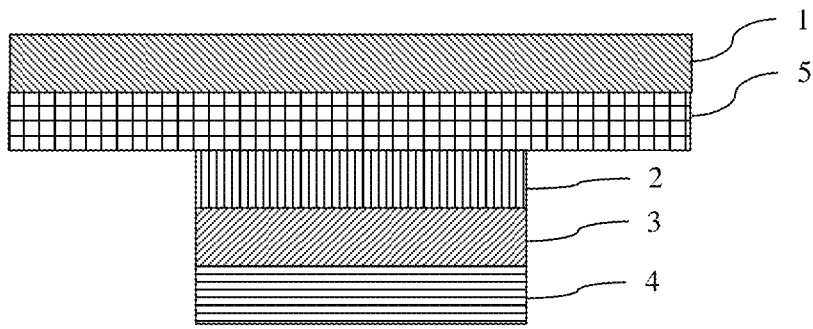

FIG. 4c shows another version of the embodiment according to FIG. 4a. In this version the separating layer (8) has been left out.

Figure 5A:
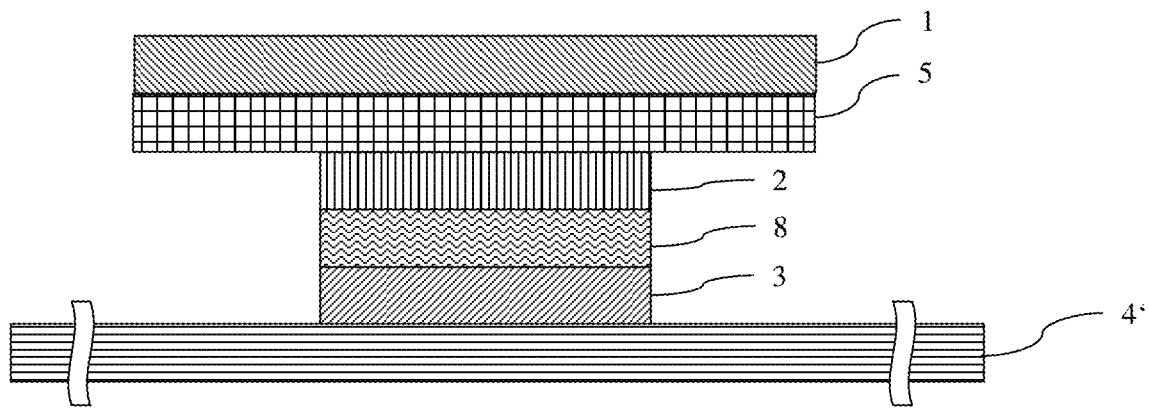

FIG. 5a shows another version of the embodiment according to FIG. 4a. In this version the delaying layer (4) is integrated into the product packaging, i.e. the delaying layer (4) is formed exclusively by a layer of the product packaging. In this case the adhesive bond takes place between the upper adhesive layer (5) and the delaying layer (4—layer of the product packaging).

Figure 5B:
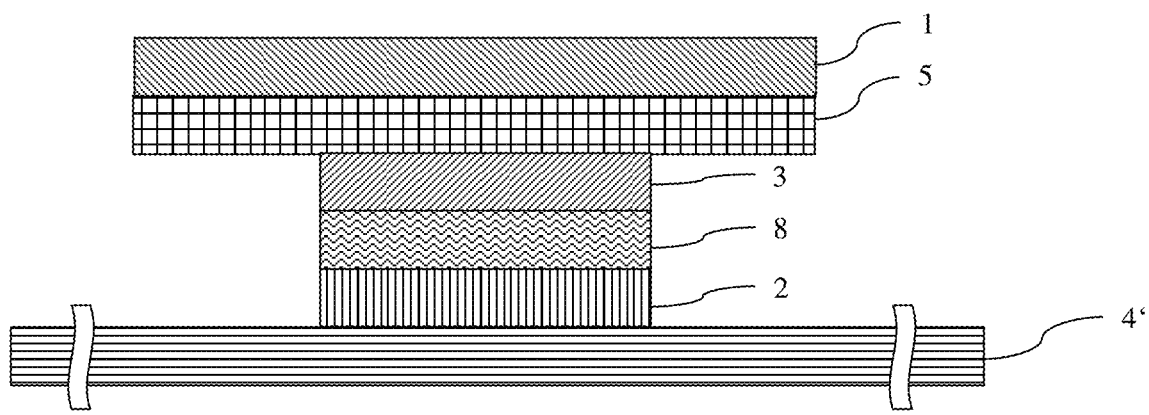

FIG. 5b shows another version of this embodiment. The layer sequence corresponds to that of FIG. 5a, the indicator layer (2) and the activator layer (3) being interchanged with one another however.

Figure 6:
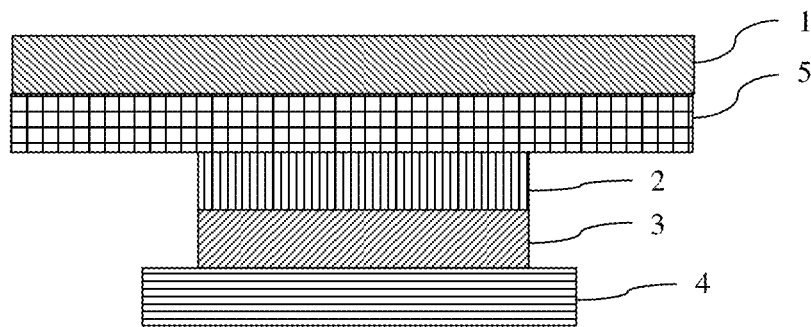

FIG. 6 shows another version of the embodiments of FIGS. 4a and 5a. In this version there is a separate delaying layer (4) in addition to the product packaging. This layer is somewhat wider than the layers lying over it. The cohesion of the layers is guaranteed by the contact between the upper adhesive layer (5) and the overlaying region of the delaying layer (4). Moreover, the region of the adhesive layer (5) overlaying the delaying layer (4) makes it possible to fix the device on the product packaging (which serves as an additional delaying layer; not shown in FIG. 6).

Figure 7:
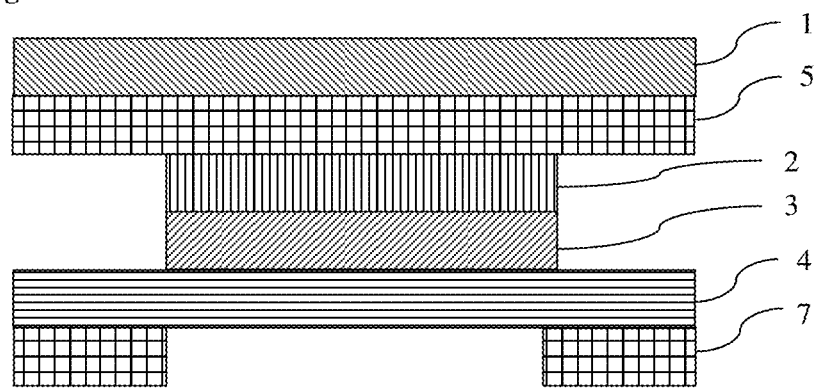

FIG. 7 shows another version of the embodiment according to FIG. 3. In this version the optional separating layer (8) has been left out. Moreover, the lower adhesive layer (7) is only located in the regions outside of the indicator layer (2) and the activator layer (3) lying over it. This version also allows the use of pressure-sensitive adhesives which are non-permeable or only very slightly permeable to moisture and water vapour.

Figure 8:
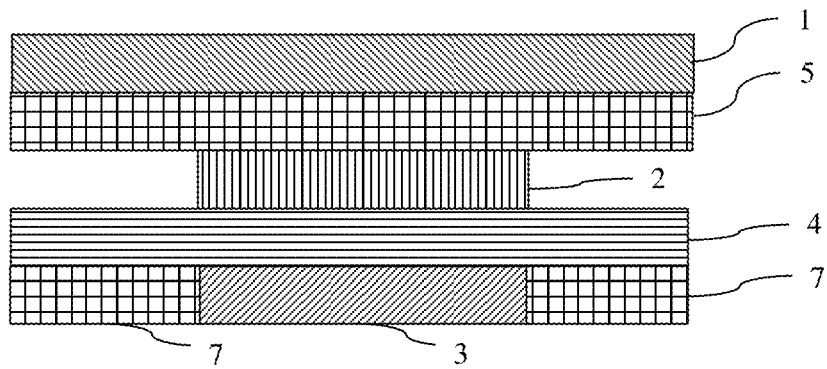

FIG. 8 relates to an embodiment in which the activator layer (3) is positioned beneath the delaying layer (4). In this case the activator migrates together with the moisture through the delaying layer (4) to the indicator layer (5).

Figure 9A:
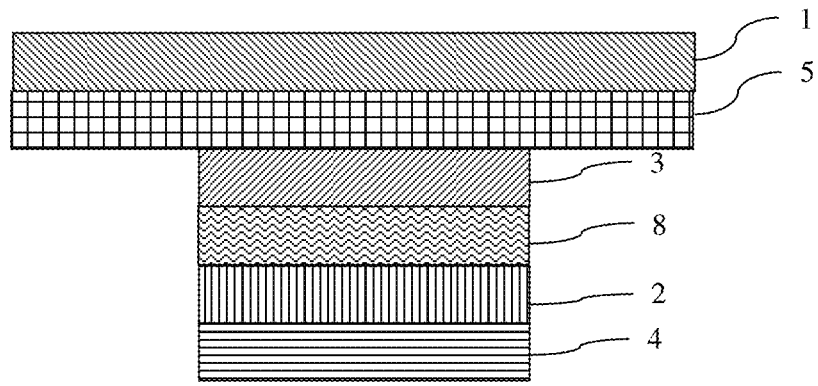
Figure 9B:
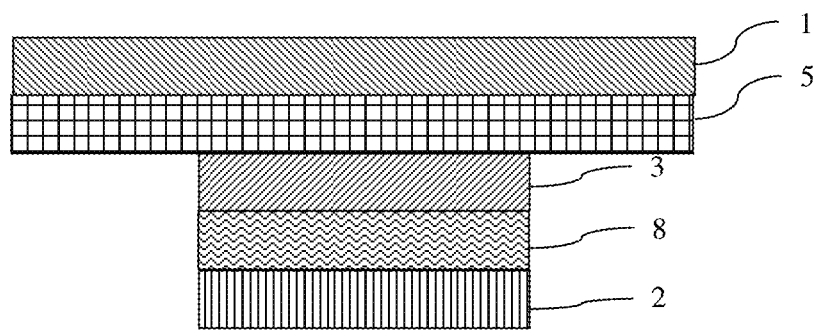
Figure 9C:
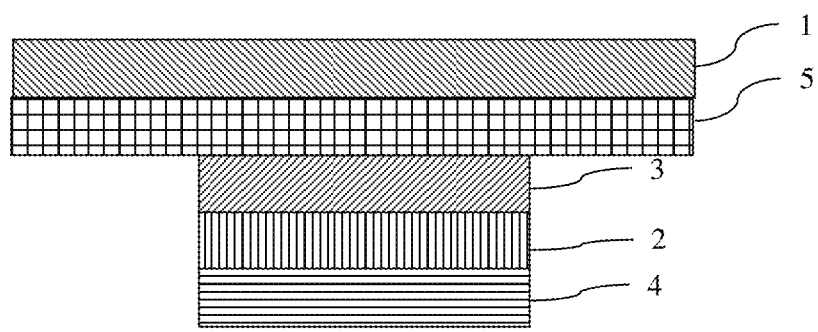

FIGS. 9a, 9b and 9c show additional embodiments in which the activator layer is located at a different point: These embodiments correspond to those of FIGS. 4a, 4b and 4c, only the indicator layer (2) and the activator layer (3) being respectively interchanged with one another.

Figure 10:
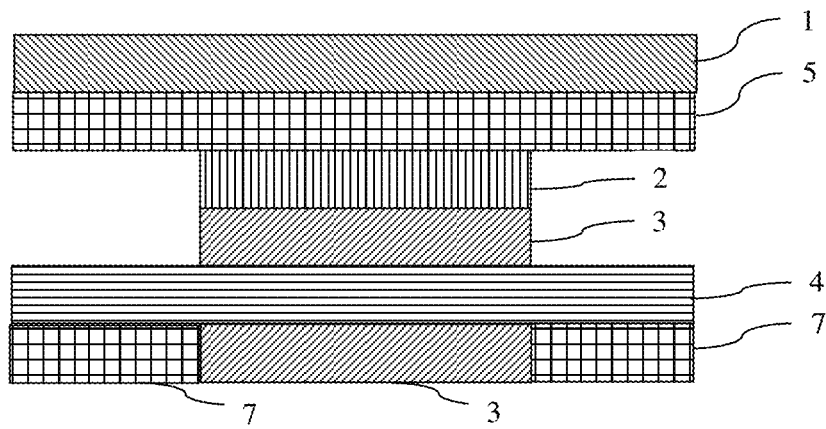

FIG. 10 shows an embodiment according to FIG. 7 which additionally has a second activator layer (3) beneath the delaying layer (4) and within the regions covered by the lower adhesive layer (7). The provision of a second activator layer offers the advantage that the colour change takes place gradually or step by step. It is therefore preferred in cases in which the display is to allow a distinction to be made between short and longer interruptions to the refrigeration chain. Of course, a second activator layer can also be provided at a different position of the device, e.g. between the indicator layer (2) and the upper adhesive layer (5).

Figure 11:
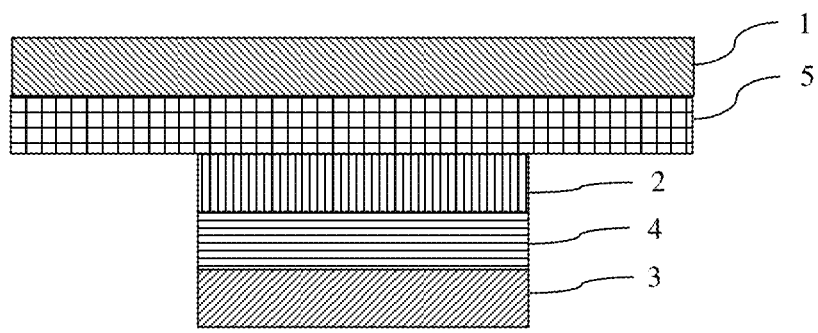

FIG. 11 shows another version of the embodiments according to FIGS. 4a and 9a: In the embodiment of FIG. 11 the activator layer (3) is positioned beneath the delaying layer (4). In this layer sequence the delaying layer (4) can act as a separating layer, and so replace the separating layer shown in FIGS. 4a and 9a.

Figure 12:
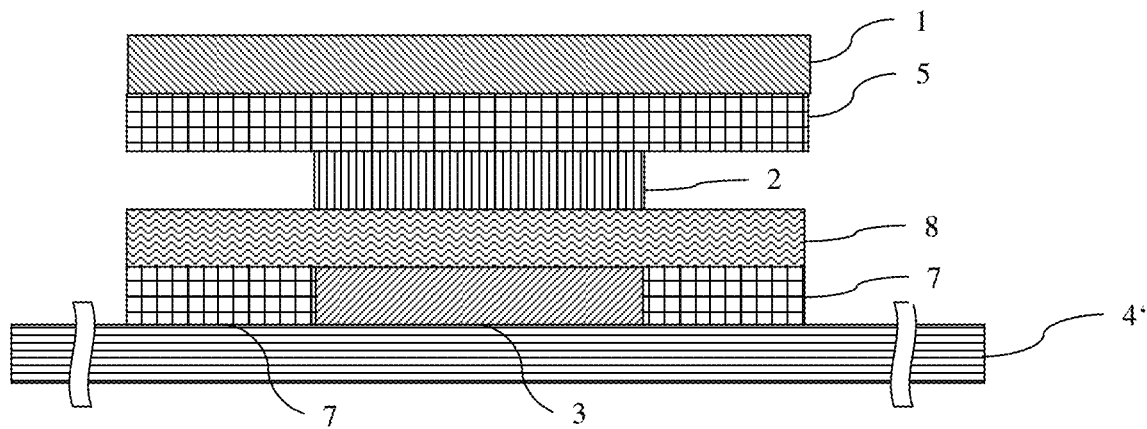

FIG. 12 relates to another embodiment in which the product packaging serves as a delaying layer (4) and in which a separating layer (8) is positioned between the indicator layer (2) and the activator layer (3). Moreover, in this embodiment the separating layer projects over the indicator layer (2) and the activator layer (3). This allows direct contact between the upper adhesive layer (5) and the separating layer (8), and this contributes to the integrity of the device. Another lower adhesive layer (7) is positioned between the separating layer (8) and the product packaging/delaying layer (4) so that it partially or fully encloses the activator layer (3).

Figure 13:
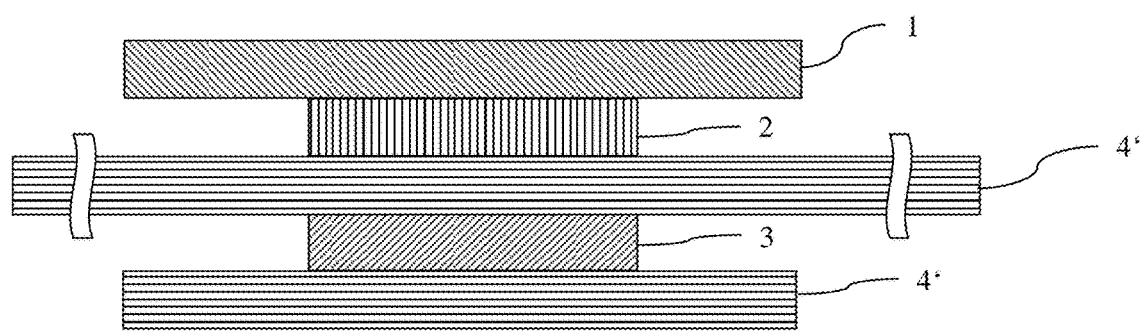

FIG. 13 shows another embodiment of the device according to the invention. In this embodiment two delaying layers (4) are provided. A first delaying layer (4) between the indicator layer (2) and the activator layer (3) is formed by the product packaging. This delaying layer (4) serves at the same time as a separating layer. A second delaying layer (4) is located beneath the activator layer (3). This can be e.g. a water vapour-permeable, thin protective film as generally used within food packaging. The device of this embodiment can be produced particularly easily at the same time as the rest of the product packaging.

The delaying layers shown in FIG. 13 are of course also used in all of the other devices according to the present invention if the invention is applied to appropriately made product packaging. It is the overall delaying effect which is caused by all of the delaying layers, including the product packaging, that is to be taken into consideration in each case.

The devices shown in FIGS. 1 to 13 (i.e. the layer sequences and additional structural features shown) are preferred within the framework of the present invention. The devices shown in FIGS. 4a-c, 5a, 5b and 9a-c are particularly preferred.

Surface Layer

The surface layer has the following functions:
The surface layer prevents moisture from penetrating from the outside to the indicator layer and/or the activator layer.
The surface layer has sufficient transparency in order to make a colour change in the indicator layer visible from the outside.
The surface layer allows additional marking of the display device according to the invention, e.g. by applying a logo.

Any film materials which are suitable for fulfilling the requirements specified above can be used as the surface layer. In this connection the two requirements specified first are of equal priority, while the possibility of applying a logo is of lesser importance. Therefore, any transparent films which are non-permeable or so slightly permeable to moisture that this has no effect upon the functional efficiency of the device according to the invention can be used. For example, surface layers through which so little moisture passes that when the device according to the invention is stored for 1 year at 25° C. and 75% relative air humidity the amount of moisture that penetrates over this period of time has no effect perceivable with the naked eye upon the function of device can be used. This means, for example, that a film made of polypropylene (PP) with a thickness of 50 µm or more, preferably 60 µm or more, can be used. One can also use other film materials such as e.g. high-density polyethylene (HDPE) with comparable water vapour permeability. With materials with low water vapour permeability it is of course possible to reduce the thickness of the film accordingly. Conversely, materials with greater water vapour permeability can also be used if the film thickness is accordingly adapted. One must of course ensure that there is sufficient transparency here. Another suitable film material is polyvinylidene chloride because its water vapour permeability is lower by approximately one order of magnitude than that of polypropylene. One can also use biodegradable films based on starch or cellulose which also meet the requirements for transparency and moisture impermeability.

One can of course also use surface layers which on their part are composed of a number of layers of different plastics (provided the requirements specified above are met by the multilayered surface layers).

As another alternative, the surface layer can be formed by applying a protective paint that is impermeable to moisture. In this case the aforementioned requirements with regard to transparency and water vapour permeability are to be imposed upon the surface layer formed from protective paint in the same way. The thickness of the protective paint is to be adapted accordingly. Silicons formed by polysiloxanes and paints formed by polymeric synthetic resins are suitable materials for the protective paint.

A combination of this protective paint and the aforementioned films is also possible. In this case the combination thus formed must of course meet the above requirements with regard to transparency and water vapour permeability.

The preferred surface layer is a polypropylene film with a thickness in the range of 40-80 µm, preferably approx. 60 µm.

Upper Adhesive Layer

The optional upper adhesive layer can be formed by any adhesive. Preferably, pressure-sensitive adhesives are used. Appropriate pressure-sensitive adhesives are described, for example, in the standard reference "Handbook of Pressure-Sensitive Adhesive Technology" by Donatas Satas (van Nostrand, N.Y. 1989). These include in particular acrylate-, natural rubber-, synthetic rubber-, silicon- or EVA-based pressure-sensitive adhesives. Pressure-sensitive adhesives with a natural base such as casein-, gelatine- and starch-based adhesives are preferred. Hot-melt adhesives and flexographic printing adhesives such as e.g. Novarad® RCL-6015 produced by Novamelt® and other UV-curable acrylate-urethane-based or acrylate-epoxy-based monomer/oligomer compositions are also conceivable.

The adhesive layer is used in a thickness of typically 5-1000 µm, preferably 10-250 µm. In particular, the aforementioned flexographic printing adhesives are typically applied an amounts of 1-50 $g/m^2$, preferably 5-40 $g/m^2$, more preferably 10-30 $g/m^2$.

Indicator Layer

The indicator layer is characterised by the presence of at least one indicator. In connection with the present invention the term "indicator" relates to any substance or mixture of substances which shows a colour change as the result of a chemical reaction or other interaction with an appropriate activator. A typical representative of these substances are the so-called pH indicators. PH indicators show a colour change as soon as the pH value changes such that a characteristic change value for the respective pH indicator is exceeded. If, for example, the pH indicator is blue in the alkaline medium (pH>7) and red in the acidic medium (pH>7), a colour change can take place if the medium in the indicator layer is alkaline and an acid is used as the activator. Likewise, it is possible to use said pH indicator in an acidic medium and to use an alkali as an activator.

Of course it is necessary to match the pH indicator, the surrounding medium and the activator to one another so as to guarantee that the desired colour change takes place upon migration of the activator into the indicator layer. With pH indicators, this can take place by an appropriate choice of pH indicator (in view of the pH value at the colour change), by setting the pH value of the indicator layer and by an appropriate choice of activator.

The pH indicators include colorants of natural origin and synthetic colorants. Natural colorants which can, for example, be obtained from plants such as vegetables and fruit are preferred. These include, among other things, flavonoids such as e.g. anthocyanins. Anthocyanidins are preferred here. The use of cyanidin is particularly preferred. Delphinidin, malvidin, peonidin and petunidin can also be mentioned. Mixtures of colorants can also be used. However, one must ensure here that the colour change characteristics of the individual colorants are matched to one another such that a clearly perceptible colour change takes place under the given conditions (presence of an activator and moisture, optionally in the presence of a matrix and additional components).

In addition to pH indicators, other substances which have an activator-induced colour change can also be used. Redox indicators can be mentioned here in particular. These are colorants which show a colour change upon reduction and/or oxidation. Typical examples are ferroin or methylene blue. A comprehensive list of redox indicators can be found on the English version of Wikipedia under the entry "Redox indicator" (September 2012 version). Accordingly, appropriate reducing agents and/or oxidising agents can be used as activator substances.

Another class of appropriate indicators are substances which show a colour change as a result of complex formation. A simple example of this is water-free copper sulphate $CuSO_4$, white, which acquires the blue colour of the complex $[Cu(H_2O)_6]SO_4$ in the presence of moisture. In this simple case the moisture itself acts as an activator so that (exceptionally) one can dispense with the activator layer. In all cases in which coloured complexes are formed with other ligands as $H_2O$, the ligand in question serves as an activator and is provided in the activator layer.

PH indicators and in particular the aforementioned anthocyanidins are preferred indicator material, and cyanidin is very particularly preferred.

In addition to the indicator substance, the indicator layer can include additional optional components. Appropriate additional optional components can be chosen in particular from the following components:

Matrix materials such as e.g. agar-agar, cellulose, starch, gum arabic, guar gum, gelatine and arrowroot starch; cellulose is preferred. Polyethylene glycol is also suitable. If the device according to the invention is produced by the preferred printing process, one must ensure that the viscosity of the matrix materials used is adapted to the printing process. This can take place by correctly choosing the chain length of the polymeric matrix materials. It is also possible to use a homogeneous or heterogeneous mixture of the matrix material with an appropriate solvent with an appropriate viscosity. It is also conceivable to use a textile fabric or fleece. If the indicator is applied to a fabric or fleece, said fabric or fleece acts more as a carrier than as a matrix enclosing the indicator. In these cases the material to be used for the fabric or fleece is not subject to any further restriction (other than that is should be inert with respect to the indicator and the activator). An appropriate material is for example cellulose, i.e. for example a layer of a paper handkerchief.

Substances which set the medium at appropriate initial conditions in order to guarantee stable colouring of the indicator (before the colour change); for example, when using a pH indicator and when using an acid as an activator the medium with alkali such as $Na_2CO_3$, $NaHCO_3$, CaO or $CaCO_3$ can be set to an alkaline pH value; setting to an acidic pH value can take place with acids such as e.g. lactic, oxalic, tartaric and citric acid;

Hygroscopic materials including hygroscopic polymers such as e.g. acrylic acid acrylate polymers and hygroscopic salts such as e.g. magnesium chloride, potassium chloride and calcium chloride which may affect (e.g. accelerate) the colour change;

Salts for lowering the melting point of water. The use of salts for lowering the melting point of water is a possibility if the device according to the invention is to be used with refrigerated products containing salt (e.g. pretzels). Due to the presence of salt in the indicator layer (and in the layers of the device according to the invention lying further to the inside), the device according to the invention can already be activated at temperatures below 0° C. at which the refrigerated product also starts to defrost. Since the lowering of the melting point is a colligative phenomenon, any salts can be used. Non-toxic salts such as e.g. NaCl are preferred.

Stabilisers, such as e.g. potassium sorbate for suppressing mould; additional preserving agents comprise calcium chloride and ethanol; the use of such stabilisers is preferred in particular when using natural colorants.

The amount of indicator colorant to be applied is typically in the range of from 0.1 to 100 $g/m^2$, preferably from 1 to 40 $g/m^2$, particularly preferably from 4 to 12 $g/m^2$. The amount of indicator applied affects the speed and intensity of the colour change. Moreover, heavy application of colour (i.e. applied amounts in the upper half of the ranges specified above) facilitates perceptibility of the colour change. On the other hand, heavy application of colour can make drying difficult within the framework of the production process. It has proven to be advantageous to apply a number of thin layers instead of one heavy indicator layer and to allow this to dry before each subsequent indicator layer is applied. For example, 2-40 layers can be applied. 4-10 layers are preferred, and 6-8 layers are more preferable. The ease of drying is of course also dependent upon the composition of the pH indicator layer (e.g. hygroscopic properties of the components and water content). By appropriate setting of the water content, choice of matrix material and application amount for each layer a desired drying speed can be set. By using printing machines the applied amount of indicator can be matched to the carrying capacity of the printing machine.

Middle Adhesive Layer

The details given in section 5.5 for the upper adhesive layer apply in the same way to the middle adhesive layer. However, in the middle adhesive layer care must be taken to ensure that sufficient moisture conveyance from the refrigerated product to the indicator layer is guaranteed.

The desired suitability for moisture conveyance can on the one hand be achieved by choosing appropriate bonding agents/adhesives. Adhesives which are capable of allowing the passage of moisture are in particular starch- or gelatine-based adhesives. By reducing the amount applied the moisture permeability of additional adhesives, which in their own right have lower moisture permeability (in relation to the same application amounts), can be brought to an acceptable level. Thus, with appropriate adaptation of the application amount, a plurality of additional adhesives can be used.

On the other hand it is possible to provide pores or openings in the middle adhesive layer in which there is no adhesive and by means of which the moisture can migrate, without hindrance, into the indicator layer. The form and size of the openings are not specified any more precisely provided that the overall surface of the openings is sufficient in order to guarantee the conveyance of moisture necessary for the desired colour change.

Separating Layer

The provision of a separating layer between the indicator layer and the activator layer is particularly recommended if the device according to the invention is to be produced by applying from layer to layer.

In this case, if the separating layer is missing, direct coating of the activator layer by the (still moist) material of the indicator layer could lead to a colour reaction on the boundary surface before the indicator layer has sufficiently dried. In order to avoid this premature boundary surface reaction, the indicator layer and the activator layer can be separated from one another by said separating layer and so the premature colour reaction can be avoided.

The separating layer must be capable of absorbing and storing small amounts of moisture without passing these on to the adjacent layer before the subsequent drying stage.

The separating layer must be dry before applying the subsequent layer. This means that the separating layer must, if applicable, be dried. The separating layer can also be applied in the form of a number of separate layers.

By appropriately choosing the adhesive, the aforementioned middle adhesive layer can act as a separating layer. Alternatively, synthetic films with appropriate moisture permeability could be used. Likewise, the use of a layer formed from starch is conceivable. Separating layers formed from gelatine or paper (cellulose) are particularly preferred. The use of a fabric or fleece is also possible. In this case too the material to be used for the fabric or fleece is not subject to any further restriction (other than that it is to be inert with respect to the indicator and the activator). Cellulose is preferred. Other materials suitable for the separating layer are waxes and in particular low-melting (<25° C.) waxes, greases and in particular low-melting (<25° C.) greases, polyethylene glycol, dextrin, casein, starch, polyvinyl alcohol, gelatine, polysaccharides such as agar-agar or pectin, and mixtures of the latter.

Activator Layer

The activator is chosen such that a chemical reaction or other interaction with the indicator leads to a colour change. When using pH indicators the activator is either an acid or an alkali. When choosing an acid, the medium of the indicator layer must be alkaline (or at least more alkaline than the pH transition point of the indicator). In the same way, when using an alkali as the activator, the medium of the indicator layer must be acidic (or at least more acidic than the pH transition point of the indicator).

Preferred acids are oxalic acid, lactic acid and tartaric acid. Citric acid is particularly preferred. When using alkalis as the activator, $Na_2CO_3$, $NaHCO_3$, $CaO$ or $CaCO_3$ can once again be used.

If redox indicators are used, what has been said about pH indicators applies in the same way. This means that oxidising agents can be used as activators provided the redox indicator is in the reduced state. In this case a reduced medium in the indicator layer can stabilise the redox indicator. Conversely, it is possible to use a reducing agent as an activator provided the redox indicator is in the oxidised form. In this case an oxidised medium in the indicator layer can stabilise the redox indicator.

Suitable oxidising agents include organic percarboxylic acids and metal salts such as $MnO_2$; suitable reducing agents include ascorbic acid, sulphite salts and tin(II) salts. When choosing appropriate oxidising agents and reducing agents, one must ensure that there is sufficient stability under the given conditions, i.e. no reaction with the other components of the activator layer is to take place over the planned storage period. If the device is used for food, care must be taken to ensure, moreover, that no health risk arises from the oxidising and/or reducing agents used.

These substances are suitable both for use as the activator and for use for the desired setting of the medium of the indicator layer.

Other components of the activator layer are optional. For example, the matrix materials specified for the indicator layer can be used. In this case too fabrics or fleeces can be used. Once again, the material to be used for the fabric or fleece is not subject to any further restriction (other than that it is to be inert with respect to the indicator and the activator). Cellulose is preferred.

In addition, a colorant can be incorporated into the activator layer. Suitable colorants are for example titanium dioxide or food-safe colorants. As a result of the colouring of the activator layer, e.g. with titanium dioxide, the contrast with the colour change in the indicator layer can be increased.

Furthermore, it can be advantageous to incorporate hygroscopic materials such as hygroscopic polymers (e.g. acrylic acid acrylate polymers) or hygroscopic salts (e.g. magnesium chloride, potassium chloride and calcium chloride) into the activator layer.

The amount of activator in the activator layer is typically 0.1 to 100 $g/m^2$, preferably 1 to 40 $g/m^2$, particularly preferably 4 to 12 $g/m^2$. In this case too it is advantageous to form the activator layer by separately applying and drying a number of individual layers so as to thus facilitate the drying. 2-30 individual layers can be used. Activator layers which are formed from 3-8 individual layers are preferred, and 4-6 individual layers are more preferable.

Delaying Layer

The delaying layer forms a type of "moisture buffer" that absorbs a certain amount of moisture before the latter is passed onto the activator layer. The advantage of this is that no colour change takes place as a result of the release of very small amounts of moisture. In this way false positive displays can be avoided, e.g. when the indicator is touched by the consumer.

The delaying layer is an optional component of the device according to the invention. The delaying effect required for successful implementation of the invention can also be achieved by other layers of the device according to the invention such as e.g. separating or adhesive layers. The delaying effect caused by the product packaging is also to be taken into account.

The period of time from the first formation of moisture to the colour change can thus be set by appropriately choosing the layers causing the delay (in relation to presence or absence, materials used and their thickness), taking into account the delaying effect of the product packaging. Critical for this period of time is the overall delaying effect of all of the layers between the product and the outermost layer relevant to the colour effect (i.e. the activator or indicator layer).

The materials that can be used for the delaying layer correspond to the materials specified under point 5.8 for the separating layer such as e.g. waxes, greases, polyethylene glycol, dextrin, etc. In other words, films with sufficient moisture permeability can be used, a layer formed from starch or, more preferably, a layer formed from gelatine. Particularly preferred is the use of paper or cardboard (i.e. a layer of cellulose), e.g. paper with a thickness of 25-80 g/m². When using paper, newspaper or paper with a comparable thickness of approx. 40-60 g/m², in particular 50 g/m², has proven to be advantageous. If a shorter change time is desired, the use of tissue paper or paper with a comparable thickness of approx. 20-30 g/m², in particular 25 g/m² has proven to be advantageous.

The use of paper or cardboard is particularly preferred in cases in which the indicator layer and the activator layer are to be laminated onto one another. In these cases the delaying layer, in addition to achieving the desired delaying effect, can also serve as a carrier material for the (indicator or activator) layer which is located closer to the refrigerated product.

As already mentioned, when choosing an appropriate delaying layer the moisture permeability of the other layers of the device up to and including the outermost colouring layer (i.e. the indicator or activator layer) and the product packaging lying beneath are advantageously also to be taken into consideration: If one of the other layers and/or the product packaging has low moisture permeability, the moisture permeability of the delaying layer should be as high as possible (or the delaying layer is completely left out if maximum permeability is required—see below), If, however, the moisture permeability of the other layers and the product packaging is high, a delaying layer should be used which lies in the lower region of the range specified above so as to thus set the desired period of time until the colour changes.

Another configuration of the present invention consists of using only the packaging of the refrigerated product (or a layer of the latter) as the delaying layer, i.e. leaving out the delaying layer as a component part of the device according to the invention. This embodiment is particularly suitable for use with product packaging which already has a sufficiently great delaying effect and/or in devices in which the other layers provided (such as e.g. adhesive and/or separating layers) provide a sufficient delay in combination with the product packaging. Here, of course, the same requirements are made of the product packaging, i.e. the packaging material (or its component part) must be capable of absorbing moisture and releasing it again with an appropriate delay. Packaging made of cardboard is very suitable for this purpose. If, however, the packaging is coated with a material that is impermeable to moisture, it must be guaranteed that this moisture-impermeable material is not present, or is at least provided with pores, in the region in which the device according to the invention is applied. Alternatively, said moisture-impermeable material can be applied only after the device according to the invention has been positioned so that the conveyance of moisture through the packaging of the device according to the invention takes place beneath the moisture-impermeable layer and is not hindered by the latter.

Lower Adhesive Layer

The details given with regard to the middle adhesive layer under point 5.7 apply in the same way to the lower adhesive layer. Here too one must ensure that there is sufficient conveyance of moisture by taking appropriate measures (i.e. by choosing an appropriate adhesive and/or providing openings).

Setting the Period of Time Until there is a Colour Change

The desired period of time between the start of the defrosting process and the colour change of the device according to the invention (hereinafter: "change time") is in the range of a few minutes to a number of hours, in particular 10 mins to 5 hrs, preferably 30 mins to 4 hrs, more preferably 1 hr to 3 hrs and in particular approximately 2 hrs.

Depending on the type of product group, it can be advantageous to develop devices according to the invention with a fast colour change speed, an average colour change speed or a slow colour change speed. Thus, a device with fast colour change should only change colour after approx. 60 minutes (e.g. in the range of 60 to 100 minutes). A device with average colour change speed should only change colour after approx. 90 minutes (e.g. in the range of 90 to 140 minutes). A device with slow colour change should only change colour after approx. 140 minutes (e.g. in the range of 140 to 200 minutes). These specified change times relate respectively to the standard test conditions according to section 5.1 above.

By means of the following repetitive process the period of time between the start of the defrosting process and the colour change of the device according to the invention can be set at the desired value:

1. In a first step a basic device according to the present description is produced. One can produce any of the devices according to the exemplary embodiments described below.
2. Next, the basic device is placed over the product packaging of the refrigerated product in question. The change time is determined as defrosting starts.
3. If the change time determined is longer than the specified target value, step 4 below is carried out; if the determined change time is shorter than the specified target value, step 5 below is carried out; otherwise there is no further need for adaptation, and the process is completed with step 8.
4. The current device (in the first round: basic device) is reworked in modified form so that the overall delaying effect of all of the relevant layers of the device is reduced when conveying moisture. This takes place by using one or a number of materials better suited to the conveyance of moisture in at least one relevant layer and/or the layer thickness of at least one relevant layer is reduced. The device thus obtained is tested according to step 6 below.
5. The current device (in the first round: basic device) is reworked in modified form so that the overall delaying effect of all of the relevant layers of the device is increased when conveying moisture. This takes place by using one or a number of materials less well suited to the conveyance of moisture in at least one relevant layer and/or the layer thickness of at least one relevant layer is increased. The device thus obtained is tested according to step 6 below.

6. Next the modified device is placed over the product packaging of the refrigerated product in question. The change time is determined as defrosting starts.
7. If the change time determined is longer than the specified target value, step 4 above is carried out; if the determined change time is shorter than the specified target value, step 5 above is carried out; otherwise the process is completed with step 8.
8. The last tested device meets the requirement; there is no longer any need for modification.

According to a preferred embodiment the delaying effect of one or a number of layers is adapted by using polyethylene glycol as the matrix material (e.g. in the indicator layer, separating layer and/or activator layer). Here the delaying effect can be set as desired, in particular by changing the chain length (i.e. molar mass) of the polyethylene glycol and/or of the mixture ratio of PEG molecules of different molar masses. Appropriate molar masses are in the range of 600 to 4000 g/mol, preferably in the range of 800 to 1500 g/mol. When using mixtures liquid polyethylene glycols with a molar mass of below 600 g/mol can also be used.

In the same way, the delaying effect can also be adapted by adapting the molecular weight of other polymeric matrix components such as polyvinyl alcohol.

Production

The device according to the invention can be produced by any methods in which the layers in question are formed or provided and can be brought into contact with the respectively adjacent layers. Here, neither the sequence of individual procedural steps (provision or formation of the respective layer and bringing into contact with the adjacent layer or layers) nor the techniques used for forming the layers are specified. However, the following procedures have proven to be advantageous.

Version (I):
(A-1) Provision of the surface layer (a),
(A-2) Coating of the surface layer (a) with the indicator layer (b),
(A-3) Optionally, drying of the indicator layer (b) to produce an arrangement (A)
(B-1) Provision of a delaying layer (d)
(B-2) Coating of the delaying layer (d) with the activator layer (c
(B-3) Optionally, drying of the activator layer (c), to produce an arrangement (A)
(C) Laminating the arrangements (A) and (B).

The chronological sequence of implementing steps (A-1) to (A-3) in relation to steps (B-1) to (B-3) is not specified in any more detail.

Any additional layers provided, such as separating or adhesive layers, are introduced at an appropriate point by carrying out the following additional steps:
(X-1) Coating of the already formed or provided adjacent layer with the appropriate material so as to form the additional layer to be applied;
(X-2) Optionally, drying of the additional layer to be applied.

If, for example, an additional adhesive layer is to be introduced between the surface layer and the indicator layer, the aforementioned steps (X-1) and (X-2) are carried out between steps (A-1) and (A-2). If, however, an adhesive layer is to be provided beneath the delaying layer (d), the respective steps (X-1) and (X-2) can be carried out before step (B-1) or at any later point in time.

Version (II):
Here all of the layers are applied sequentially (i.e. after providing or applying and drying the respectively preceding layer). In order to avoid a premature colour reaction on the boundary surface between the indicator layer and the activator layer, in this version a separating layer is provided between these two layers.

The sequence of applying the individual layers is determined by the desired sequence of layers in the device to be produced. However, it is possible to invert the sequence of applying the individual layers, i.e. as a first step the surface layer (a) or the delaying layer (d) can be provided. The following procedures are thus produced for an exemplary layer sequence:
(D-1) Provision of the surface layer (a),
(D-2) Coating of the surface layer (a) with the indicator layer (b),
(D-3) Optionally, drying of the indicator layer (b)
(D-4) Coating of the indicator layer (b) with the separating layer (t),
(D-5) Optionally, drying of the separating layer (t),
(D-6) Coating of the separating layer (t) with the activator layer (c),
(D-7) Optionally, drying of the activator layer (c),
(D-8) Coating of the activator layer (c) with the delaying layer (d),
(D-9) Optionally, drying of the delaying layer (d);
and
(D'-1) Provision of the delaying layer (d),
(D'-2) Coating of the delaying layer (d) with the activator layer (c),
(D'-3) Optionally, drying of the activator layer (c)
(D'-4) Coating of the activator layer (c) with the separating layer (t),
(D'-5) Optionally, drying of the separating layer (t),
(D'-6) Coating of the separating layer (t) with the indicator layer (b),
(D'-7) Optionally, drying of the indicator layer (b),
(D'-8) Coating of the indicator layer (b) with the surface layer (a),
(D'-9) Optionally, drying of the surface layer (a).

In these method versions too, any additional layers provided, such as additional separating or adhesive layers, can be introduced at an appropriate point by carrying out the additional steps (X-1) and (X-2) described above.

In alternative layer sequences according to FIGS. 1 to 13 the sequence of applying the individual layers changes accordingly. Thus, in these methods, any layers can of course also be left out. According to one preferred version of the methods described above, no separating layer is applied. Steps D-4 and D5 or D'-4 and D'-5 are also left out. In this case it is essential to avoid a premature colour reaction between the activator and the indicator during production. This can be achieved by using a highly volatile solvent in the printing process. Suitable highly volatile solvents are in particular organic solvents that have a vapour pressure that is higher than the vapour pressure of water (respectively at 20° C.) and/or with which the boiling point is lower than with water. They include ethanol, acetone, diethyl ether, methanol, isopropanol, ethyl acetate and methyl acetate as well as mixtures of such solvents. Ethanol is preferred. The printing process is carried out layer by layer, as above. It is very advantageous that the second printed layer relevant to the colour formation is dried as quickly as possible after application. In the methods described above this means that steps D6 and D7 are carried out almost simultaneously and directly after step D-3 (or that steps D'-6 and D'-7 are carried out almost simultaneously and directly after step D'-3). The immediate drying can be achieved by generating a gas flow, preferably an air flow, over the printed surface. The highly volatile solvent is discharged by the gas flow before undesired migration of the activator into the indicator layer takes place.

The layers can be applied by any technology which is suitable for the formation of thin layers. Printing machines which are capable of applying a number of material layers one after the other and of respectively drying them directly after application have proven to be particularly suitable. Printing machines, for example, which work according to the offset, flexographic or screen printing processes are suitable. Other methods for applying thin layers include spraying processes, doctor blade application processes, dipping processes etc.

The compositions to be applied for every material layer are adapted as regards their viscosity to the requirements of the chosen (printing) process. Appropriate thickening agents can be used for this purpose. All thickening agents which are inert with respect to the indicator and the activator and which do not hinder the desired conveyance from the activator to the indicator are suitable. Polysaccharides such as pectin, xanthan, guar gum, agar-agar, cellulose and cellulose derivatives as well as calcium acetate and glycerine can be mentioned as examples. The desired viscosity can also take place by suitable adaptation of the concentration of the materials in the chosen solvent. If an additional increase of the concentration is desired, the production of the solution can also take place at an increased temperature. It is thus possible, for example, to obtain a highly concentrated solution of citric acid in water by producing a saturated solution at approx. 50° C. to 60° C. In this embodiment the application of the materials can also take place at an increased temperature in order to prevent premature solidification or crystallisation of individual components.

However, when using spraying processes it is not necessary to increase the viscosity of the solution to be sprayed on, e.g. by adding thickening agents.

The drying of the individual applied layers (and also the dry storage of the device produced) is important in order to prevent a premature colour change. The degree of drying must be appropriately chosen in order to fulfil this requirement. As already mentioned in sections 5.6 and 5.9, it may be advantageous for acceleration of the drying to form one or more of the layers of the device according to the invention by respectively applying a plurality of thin layers with the same composition, each last applied layer being dried before applying the next layer. As mentioned above, the drying can be accelerated by a gas flow, preferably an air flow.

If so desired, individual drying steps can nevertheless be cut short or completely avoided provided it is guaranteed that at the moment at which the activator layer and the indicator layer are brought into contact (possibly by means of an adhesive or separating layer), the degree of drying is sufficiently high in order to prevent a colour change. Of course drying is not required if a (sufficiently dry) pre-produced film or layer is applied to the already existing layer or layers.

In the embodiments of the present invention, in which the device according to the invention is integrated into the packaging of the refrigerated product (e.g. by using the packaging material as a delaying layer), production takes place in the same way, version (II) advantageously being chosen and the layer structure starting with the delaying layer. Alternatively, the layer structure could start, according to version (II), from the surface layer and end before the delaying layer, e.g. with the formation of the activator layer. The intermediate product thus produced can then be applied to the packaging. Another possibility consists of proceeding according to version (I) and producing arrangement (A) as described above.

When producing arrangement (B) the activator layer and optionally additional layers are applied directly to the packaging. Arrangements (A) and (B) are then laminated.

Applications

The device according to the invention is suitable for the monitoring of the previous thermal history of any products which have to be permanently refrigerated. Deep frozen foods first and foremost are considered here. Furthermore, the device according to the invention is also suitable, however, for use in connection with other products which have to be permanently refrigerated or deep-frozen. The product to be refrigerated should contain moisture, however, in order to guarantee correct functioning of the device according to the invention.

The practical application logically takes place by placing the device according to the invention over the outer packaging of the product to be refrigerated. Good perceptibility of the colour change can thus be guaranteed. One must of course ensure here that moisture can pass from inside the packaging to the device according to the invention as soon as the refrigeration chain is broken.

One essential advantage of the present invention is that a reliable display takes place, independently of whether there is direct contact between the refrigerated product and the display device. Therefore, the device according to the invention can be applied at any point of the packaging. The size of the area covered by the device according to the invention is not specified any more precisely. With regard to the good perceptibility of the colour change, this area should however advantageously not be less than 0.2 $cm^2$, preferably 0.5 $cm^2$, more preferably 0.8 $cm^2$.

The application of a logo, additional lettering or instructions is conceivable in connection with the applications of the present invention and is also advantageous in order to draw the consumer's attention to the invention. A logo, lettering etc. can be applied to the device according to the invention. In this connection one should, however, ensure that the logo, lettering etc. are applied such that the colour change can be reliably seen. One should avoid covering the whole of the device according to the invention with e.g. a logo. Of course, within the framework of the present invention it is also possible to apply a logo, lettering etc. to the packaging as well as to the device according to the invention.

Preferred Embodiments

One prefers the present invention using the features, components and/or measures which are specified above as examples and/or are identified as "preferred". More preferred are the embodiments of the present invention wherein two or more of the features, components and/or measures specified as examples and/or identified as "preferred" are combined with one another.

Particularly preferred are:

(i) the use of the materials specified as examples and/or identified as "preferred" for the surface layer in devices which have a layer sequence according to FIGS. 1 to 13;

(ii) the use of the materials specified as examples and/or identified as "preferred" for the indicator layer in devices which have a layer sequence according to FIGS. 1 to 13;

(iii) the use of the materials specified as examples and/or identified as "preferred" for the activator layer in devices which have a layer sequence according to FIGS. 1 to 13;

(iv) the use of the materials specified as examples and/or identified as "preferred" for the delaying layer in devices which have a layer sequence according to FIGS. 1 to 13;

(v) the use of the materials specified as examples and/or identified as "preferred" for the adhesive layers in devices which have a layer sequence according to FIGS. 1 to 13;

(vi) the use of the materials specified as examples and/or identified as "preferred" for the separating layer in devices which have a layer sequence according to FIGS. 1 to 13;

(vii) the use of the materials specified as examples and/or identified as "preferred" for the surface layer in combination with the use of the materials specified as examples and/or identified as "preferred" for the indicator layer;

(viii) the use of the materials specified as examples and/or identified as "preferred" for the surface layer in combination with the use of the materials specified as examples and/or identified as "preferred" for the activator layer;

(ix) the use of the materials specified as examples and/or identified as "preferred" for the surface layer in combination with the use of the materials specified as examples and/or identified as "preferred" for the delaying layer;

(x) the use of the materials specified as examples and/or identified as "preferred" for the surface layer in combination with the use of the materials specified as examples and/or identified as "preferred" for the adhesive layers;

(xi) the use of the materials specified as examples and/or identified as "preferred" for the surface layer in combination with the use of the materials specified as examples and/or identified as "preferred" for the separating layer;

(xii) the use of the materials specified as examples and/or identified as "preferred" for the indicator layer in combination with the use of the materials specified as examples and/or identified as "preferred" for the activator layer, wherein one must additionally note that the indicator and the activator (as well as the medium, for example in relation to its pH) must be matched to one another;

(xiii) the use of the materials specified as examples and/or identified as "preferred" for the indicator layer in combination with the use of the materials specified as examples and/or identified as "preferred" for the delaying layer;

(xiv) the use of the materials specified as examples and/or identified as "preferred" for the indicator layer in combination with the use of the materials specified as examples and/or identified as "preferred" for the adhesive layers;

(xv) the use of the materials specified as examples and/or identified as "preferred" for the indicator layer in combination with the use of the materials specified as examples and/or identified as "preferred" for the separating layer;

(xvi) the use of the materials specified as examples and/or identified as "preferred" for the activator layer in combination with the use of the materials specified as examples and/or identified as "preferred" for the delaying layer;

(xvii) the use of the materials specified as examples and/or identified as "preferred" for the activator layer in combination with the use of the materials specified as examples and/or identified as "preferred" for the adhesive layers;

(xviii) the use of the materials specified as examples and/or identified as "preferred" for the activator layer in combination with the use of the materials specified as examples and/or identified as "preferred" for the separating layer;

(xix) the use of the materials specified as examples and/or identified as "preferred" for the delaying layer in combination with the use of the materials specified as examples and/or identified as "preferred" for the adhesive layers;

(xx) the use of the materials specified as examples and/or identified as "preferred" for the delaying layer in combination with the use of the materials specified as examples and/or identified as "preferred" for the separating layer; and (xxi) the use of the materials specified as examples and/or identified as "preferred" for the adhesive layers in combination with the use of the materials specified as examples and/or identified as "preferred" for the separating layer.

More preferred are those devices according to the invention wherein the preferred combinations specified above are further combined, i.e. devices with feature combinations (i)-(ii), (i)-(iii), (i)-(iv), (i)-(v), (i)-(vi), (i)-(vii), (i)-(viii), (i)-(ix), (i)-(x), (i)-(xi), (i)-(xii), (i)-(xii), (i)-(xiv), (i)-(xv), (i)-(xvi), (i)-(xvii), (i)-(xviii), (i)-(xix), (i)-(xx), (i)-(xxi), (ii)-(iii), (ii)-(iv), (ii)-(v), (ii)-(vi), (ii)-(vii), (ii)-(viii) (ii)-(ix), (ii)-(x), (ii)-(xi), (ii)-(xii), (ii)-(xiii), (ii)-(xiv), (ii)-(xv), (ii)-(xvi), (ii)-(xvii), (ii)-(xviii), (ii)-(xvix), (ii)-(xx), (ii)-(xxi), (iii)-(iv), (iii)-(v), (iii)-(vi), (iii)-(vii), (iii)-(viii), (iii)-(ix), (iii)-(x), (iii)-(xi), (iii)-(xii), (iii)-(xiii), (iii)-(xiv), (iii)-(xv), (iii)-(xvi), (iii)-(xvii), (iii)-(xviii), (iii)-(xix), (iii)-(xx), (iii)-(xxi), (iv)-(v), (iv)-(vi), (iv)-(vii), (iv)-(viii), (iv)-(ix), (iv)-(x), (iv)-(xi), (iv)-(xii), (iv)-(xiii), (iv)-(xiv), (iv)-(xv), (iv)-(xvi), (iv)-(xvii), (iv)-(xviii), (iv)-(xix), (iv)-(xx), (iv)-(xxi), (v)-(vi), (v)-(vii), (v)-(viii), (v)-(ix), (v)-(x), (v)-(xi), (v)-(xi), (v)-(xii), (v)-(xiv), (v)-(xv), (v)-(xvi), (v)-(xvii), (v)-(xviii), (v)-(xix), (v)-(xx), (v)-(xxi), (vi)-(vii), (vi)-(viii), (vi)-(ix), (vi)-(x) (vi)-(xi), (vi)-(xii), (vi)-(xiii), (vi)-(xiv), (vi)-(xv), (vi)-(xvi), (vi)-(xvii), (vi)-(xviii), (vi)-(xix), (vi)-(xx) (vi-xxi), (vii)-(viii), (vii)-(ix), (vii)-(x), (vi)-(xi), (vi)-(xii), (vii)-(xiii), (vii)-(xiv), (vii)-(xv), (vii)-(xvi), (vii)-(xvii), (vii)-(xix), (vii)-(xx), (vii)-(xxi), (viii)-(ix), (viii)-(x), (viii)-(xi), (viii)-(xii), (viii)-(xiii)-(xiv), (viii)-(xv), (viii)-(xvi), (viii)-(xvii), (viii)-(xviii), (viii)-(xix), (viii)-(xx), (viii)-(xxi), (ix)-(x), (ix)-(xi), (ix)-(xii), (ix)-(xii), (ix)-(xiv), (ix)-(xv), (x)-(xvi), (ix)-(xvii), (ix)-(xviii), (ix)-(xix), (ix)-

(xx), (ix)-(xxi), (x)-(xi), (x)-(xii), (x)-(xii), (x)-(xiv), (x)-(xv), (x)-(xvi), (x)-(xvii), (x)-(xviii), (x)-(xix), (x)-(xx), (x)-(xxi), (xi)-(xii), (xi)-(xiii), (xi)-(xiv), (xi)-(xv), (xi)-(xvi), (xi)-(xvii), (xi)-(xviii), (xi)-(xix), (xi)-(xx), (xi)-(xxi), (xii)-(xiii), (xii)-(xiv), (xii)-(xv), (xii)-(xvi), (xii)-(xvii), (xii)-(xviii), (xii)-(xix), (xii)-(xx), (xii)-(xxi), (xiii)-(xiv), (xiii)-(xv), (xiii)-(xvi), (xiii)-(xvii), (xiii)-(xviii), (xiii)-(xix), (xiii)-(xx), (xiii)-(xxi), (xiv)-(xv), (xiv)-(xvi), (xiv)-(xvii), (xiv)-(xviii), (xiv)-(xix), (xiv)-(xx), (xiv)-(xxi), (xv)-(xvi), (xv)-(xvii), (xv)-(xviii), (xv)-(xix), (xv)-(xx), (xv)-(xxi), (xvi)-(xvii), (xvi)-(xviii), (xvi)-(xix), (xvi)-(xx), (xvi)-(xxi), (xvii)-(xviii), (xvii)-(xix), (xvii)-(xx), (xvii)-(xxi), (xviii)-(xix), (xviii)-(xx), (xviii)-(xxi), (xix)-(xx), (xix)-(xxi) und (and) (xx)-(xxi). Combinations of these combinations listed above are even more preferred.

With regard to the production methods according to the invention, the methods specified above in section 5.13, which lead to the preferred devices according to the invention, are particularly preferred. Methods using printing machines are also preferred, particularly when they lead to the preferred devices according to the invention.

With regard to the industrial production of the devices according to the invention, the following embodiments, for example, are particularly preferred:

A preferred version has the following layer sequence:
surface layer—optional adhesive layer—indicator layer—activator layer.

These layers may be applied over the adhesive layer on the product packaging serving as a delaying layer (with the adhesive layer preferably to the side of the indicator and the activator layer). A similar layer sequence is shown in FIG. 5a, but additionally with a separating layer. According to the preferred version described here the separating layer is avoided by appropriate production methods. This type of appropriate production can take place using an industrial printing process (e.g. flexographic printing). In this connection the surface layer is first of all printed with the indicator layer, followed by further printing with the activator layer. In order to avoid a premature colour change, in this case appropriate measures must be taken so that the activator layer dries so quickly directly after application that no significant migration into the activator layer takes place. As described above, this can take place by using a highly volatile solvent. The device obtained in this way can be mounted, e.g. on silicon paper. In a separate procedural step (which may also be spatially and/or temporally separate) it is stuck onto the product packaging. In this connection an anthocyanidin colorant is preferably used as the indicator, and citric acid, lactic or tartaric acid as the activator. The aforementioned embodiment is very particularly preferred when using a cyanidin colorant as the indicator in conjunction with citric acid as the activator.

Another preferred version has the following layer sequence:
surface layer—optional adhesive layer—indicator layer—separating layer—activator layer.

These layers may be applied over the adhesive layer on the product packaging serving as a delaying layer (with the adhesive layer preferably to the side of the indicator and the activator layer). One such layer sequence is shown in FIG. 5a. In this version it is particularly preferred to print a paper serving as a separating layer on one side with the indicator layer and on the other side with the activator layer. The intermediate product obtained in this way can be die cut in the appropriate format and stuck onto a surface layer provided with an adhesive layer. The device obtained in this way can be mounted, e.g. on silicon paper. In a separate procedural step (which may also be spatially and/or temporally separate) it is stuck onto the product packaging. In this connection too, an anthocyanidin colorant is preferably used as the indicator, and citric acid, lactic or tartaric acid as the activator. The aforementioned embodiment is very particularly preferred when using a cyanidin colorant as the indicator in conjunction with citric acid as the activator.

The preferred uses and applications according to the invention of the present invention are in particular the uses and applications specified above in section 5.14 which include the use of the preferred devices according to the invention.

EXAMPLES

Example 1

A device according to the invention according to production version I is produced by a flexographic printing process. The layer structure corresponds to the layer sequence shown in FIG. 9c.

The surface layer is formed from a "PP Clear TC50 P" PP film made by the company UPM Raflatac®. This PP film is already provided with an adhesive layer at the factory. Therefore, the adhesive layer over an acrylate base "SP38" also originates from UPM Raflatac®.

The activator layer is formed over the adhesive from citric acid in a cellulose matrix. The application thickness is 6 g/m$^2$. The layer is applied using the printing process in the form of an aqueous dispersion with a cellulose content of approx. 5% by weight and a citric acid content of approx. 1% by weight and is dried immediately afterwards.

Cyanidin in a cellulose matrix is used as the indicator. The indicator layer is applied to tissue paper with a thickness of 25 g/m$^2$ as a delaying layer. The application thickness is 6 g/m$^2$. In this case too the layer is applied in the form of an aqueous dispersion in which the cellulose content is 5% by weight and the cyanidin content is 1% by weight. The layer is dried immediately after application.

Next, the activator layer and the indicator layer are laminated onto one another.

A colour change can be seen between the first defrosting of the refrigerated product (300 g deep frozen peas, temperature increase from −18° C. to 20° C.) after 150 minutes.

Example 2

A device according to the invention is produced in the same way as Example 1, the difference being that 50 g/m$^2$ thick newspaper is used.

In this example a colour change was observed under identical test conditions after 200 minutes.

The invention claimed is:
1. A device for indicating breaks in the refrigeration chain of a frozen product, comprising the following layers:
   (a) a surface layer (1) impermeable to moisture;
   (b) an indicator layer (2) comprising at least one indicator; and
   (c) an activator layer (3) comprising at least one activator,
   wherein the surface layer is positioned over the indicator layer and the activator layer,
   wherein the surface layer prevents moisture from penetrating from the outside to the indicator layer and/or the activator layer,
   wherein the device does not comprise a moisture reservoir, and wherein the device is configured such that, when applied to an upper surface of a packaging surrounding the frozen product, the surface layer in the device is the furthest away from the frozen product packaging, and, upon sufficient heating of the frozen product to above a freezing point of the frozen product, moisture originating from the frozen product penetrates into the device through the frozen product packaging and from below the device and migrates upwardly from the product packaging through the device towards the surface layer, thereby mobilizing the indicator and/or activator to bring components of the indicator layer and the activator layer together.

2. The device according to claim 1, wherein the indicator layer comprises a pH indicator, and the activator layer comprises an acid or an alkali as the activator.

3. The device according to claim 1, wherein the indicator layer and/or the activator layer comprise a matrix material selected from at least one of the following: agar-agar, carrageenan, gelatine, starch, gum arabic, cellulose, arrowroot starch, guar gum and polyethylene glycol.

4. The device according to claim 1, wherein the indicator layer and/or the activator layer comprise at least one hygroscopic salt.

5. The device according to claim 1, wherein the activator layer (c) is formed from 2-30 sequential individual layers.

6. The device according to claim 1, wherein the indicator layer (b) is formed from 2-40 sequential individual layers.

7. The device according to claim 1, wherein the layers (a), (b), and (c) are arranged as follows:
(a) surface layer (1),
(b) indicator layer (2), and
(c) activator layer (3);
or
(a) surface layer (1),
(c) activator layer (3), and
(b) indicator layer (2).

8. The device according to claim 1, wherein the device is applied to packaging of a product.

9. The device according to claim 8, wherein the product is refrigerated and wherein a period of time between first defrosting of the product and color change of the indicator is in the range of 0.5 hours to 3 hours.

10. A method for producing a device according to claim 1 wherein one or more of the layers present in the device are formed by carrying out procedural steps (i) and (ii) sequentially one or more times:
(i) printing and
(ii) drying the printed layer.

11. A method for producing a device according to claim 1, wherein
a surface layer is provided; and wherein the other layers of the device are applied sequentially according to the sequence of their arrangement in the device; and wherein
at least upon applying the indicator layer and the activator layer the layer which is applied first is dried prior to applying a subsequent layer, and the component or components of the subsequent layer are provided and applied in a highly volatile organic solvent if no additional layer is provided between the indicator layer and the activator layer.

12. Packaging for a deep frozen product comprising the device according to claim 1.

13. A deep frozen product comprising the packaging according to claim 12.

14. The device according to claim 2, wherein the pH indicator is an anthocyanin colorant.

15. The device according to claim 4, wherein the at least one hygroscopic salt is chosen from the group consisting of magnesium chloride, potassium chloride and calcium chloride.

16. The device according to claim 1, further comprising:
(d) a delaying layer (4), wherein
the surface layer is positioned over the delaying layer, and
the indicator layer is positioned between the surface layer and the delaying layer.

17. The device according to claim 16, wherein the delaying layer (d) is formed from paper or cardboard with a thickness of 40-60 g/cm$^2$.

18. The device according to claim 16, wherein the layers (a), (b), (c) and (d) are arranged as follows:
(a) surface layer (1),
(b) indicator layer (2),
(d) delaying layer (4), and
(c) activator layer (3);
or
(a) surface layer (1),
(c) activator layer (3),
(b) indicator layer (2), and
(d) delaying layer (4);
or
(a) surface layer (1),
(b) indicator layer (2),
(c) activator layer (3), and
(d) delaying layer (4).

19. A method for producing a device according to claim 16 selected from the following methods:
(a) A method comprising the following steps:
(A-1) providing the surface layer (1),
(A-2) coating the surface layer (1) with the indicator layer (2),
(A-3) drying the indicator layer (2) to produce an arrangement (A);
(B-1) providing a delaying layer (4),
(B-2) coating the delaying layer (4) with the activator layer (3),
(B-3) drying the activator layer (3) to produce an arrangement (B),
(C) laminating the arrangements (A) and (B); and
(b) A method comprising the following steps:
(A'-1) providing the surface layer (1),
(A'-2) coating the surface layer (a) with the activator layer (3),
(A'-3) drying the activator layer (3) to produce an arrangement (A')
(B'-1) providing a delaying layer (d)
(B'-2) coating the delaying layer (d) with the indicator layer (2),
(B'-3) drying the indicator layer (2) to produce an arrangement (B'),
(C') laminating the arrangements (A') and (B').

20. A method for producing a device according to claim 16, wherein
a first layer, chosen from the surface layer and the delaying layer, is provided; and wherein the other layers of the device are applied sequentially according to the sequence of their arrangement in the device; and wherein
at least upon applying the indicator layer and the activator layer the layer which is applied first is dried prior to applying a subsequent layer, and the component or components of the subsequent layer are provided and applied in a highly volatile organic solvent if no additional layer is provided between the indicator layer and the activator layer.

\* \* \* \* \*